United States Patent [19]

Kiovsky et al.

[11] 3,979,374

[45] Sept. 7, 1976

[54] POLYMERIC PYRROLLIC DERIVATIVE

[75] Inventors: Thomas E. Kiovsky; Richard C. Kromer, both of Houston, Tex.

[73] Assignee: Shell Oil Company, Houston, Tex.

[22] Filed: June 13, 1975

[21] Appl. No.: 587,198

[52] U.S. Cl. .................. 526/12; 260/63 CQ; 260/65; 526/11.1; 526/50
[51] Int. Cl.$^2$ .............. C08F 110/02; C08G 4/00; C08G 12/00
[58] Field of Search ............ 260/94.9 R, 94.9 GB, 260/63 CQ, 88.1 R, 88.1 PA, 88.2 R, 65, 94.9 GD

[56] References Cited
UNITED STATES PATENTS

| | | | |
|---|---|---|---|
| 2,495,255 | 1/1950 | Little | 260/63 CQ |
| 2,641,590 | 6/1953 | Hoehn | 260/63 CQ |
| 3,689,460 | 9/1972 | Nozaki | 260/63 CQ |
| 3,694,412 | 9/1972 | Nozaki | 260/63 CQ |
| 3,790,460 | 2/1974 | Weintraub | 260/63 CQ |
| 3,835,123 | 9/1974 | Nozaki | 260/63 CQ |

OTHER PUBLICATIONS
D. D. Coffman, H. H. Hoehn & J. T. Maynard; "Reductive Amination of Ethylene – CO Polyketones" A New Class of Polyamines, J.A.C.S. 76, 6394–6399, 1954.

*Primary Examiner*—Joseph L. Schofer
*Assistant Examiner*—Herbert J. Lilling

[57] ABSTRACT

A thermoplastic pyrrollic polymer composition and the method for making the same are disclosed. The polymer composition comprises

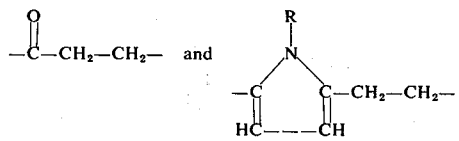

randomly distributed units of
in specified ratios. The process for producing the polymer comprises reacting a polyketone and a primary monoamine in specified amounts wherein the polyketone is the equimolar alternate copolymer of ethylene and carbon monoxide.

10 Claims, No Drawings

POLYMERIC PYRROLLIC DERIVATIVE

THE PRIOR ART

Interpolymers of carbon monoxide and ethylene (polyketones), as well as processes for their preparation are well known. The first polyketones were disclosed by Farbenfabriken Bayer in 1941. German Patent No. 863,771. Significant classes of polyketones which have been prepared include: (1) high molecular weight copolymers which are essentially polyethylene with less than 1% CO incorporated, prepared via Ziegler catalysis (British Patent No. 925,130); (2) free radical and radiation initiated copolymers which have low molecular weight and a CO content varying up to 50% (W. G. Barb, Journal of the Americal Chemical Society, 75, 224 (1953), P. P. Colombo et al, Journal of Polymer Science B1, 447 (1963)); and (3) transition metal catalyzed copolymers with an apparent regular alternating-chain structure. Processes to prepare these alternating-chain structure polyketones are disclosed in U.S. Pat. No. 2,577,208 [$K_2Ni(CN)_4$ catalyst], British Pat. No. 1,081,304 [$(Bu_3P)_2Pd(Cl)_2$ catalyst], and U.S. Pat. No. 3,835,123 [$HPd(CN)_3$ catalyst].

The transition metal-catalyzed polyketones with an alternating-chain structure are particularly desirable polymers because of the low cost of the reactants (carbon monoxide and ethylene) employed and because of their potential use as premium thermoplastics. However, some of the present high molecular weight equimolar alternating copolymers of ethylene and carbon monoxide can not be processed by the usual extrusion methods without destroying some of the thermoplastic properties. In particular, when an equimolar alternating copolymer of ethylene and carbon monoxide having a molecular weight of about 300,000 daltons and a melting point of about 250°C prepared using a quaternary ammonium tetracyanonickelate catalyst and a hexafluoroisopropanol solvent is pressed to a film at a temperature near its melting point, decomposition, characterized by loss of water and discoloration, occurs. These same polyketones undergo significant crosslinking when heated for as little as four minutes at tempertures of 20° to 30°C below their melting point.

One means to improve the processibility of the high molecular weight polyketone is to derivitize the polyketone. However, the polymer products obtained by the reductive amination of polyketones are not suitable thermoplastics. For example, employing the procedure disclosed by Coffman et al, Journal of the American Chemical Society, 76, 6394 (1954), a dark amorphous product unsuitable as thermoplastic was prepared by reacting a polyketone with dimethylamine over a complex triethylaluminum/cobalt carbonyl catalyst in a 1000 psig hydrogen atmosphere. The polymeric polyamines produced according to the reductive amination process disclosed in U.S. Pat. No. 2,495,255, are likewise unsuitable as thermoplastics. Two derivatives of a polyketone having improved processibility are disclosed in our copending patent applications, Polymeric Derivative, Ser. No. 587,001, Filed 6-13-75; and Polyketone Derivative, Ser. No. 587,199, Filed 6-13-75. A pyrrollic derivative of a polyketone, suitable as a thermoplastic, has now been found that not only is insignificantly crosslinked at extrusion temperatures, but also possesses some elastomeric properties not found in the unmodified polyketone.

SUMMARY OF THE INVENTION

The present invention discloses a thermoplastic polymer composition and the method for making the same, which composition comprises randomly distributed units of

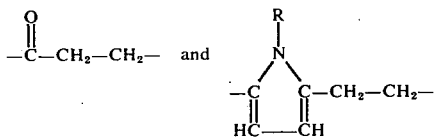

in specified ratios.

DETAILED DESCRIPTION OF THE INVENTION

The Polymer Composition

The thermoplastic polymer disclosed is characterized by random distribution along the polymer chain of $n$ units of

and $m$ units of

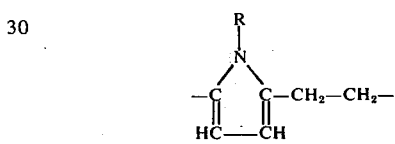

where R is selected from the group consisting of alkyl, aryl, and alkenyl groups of from 1 to 20 carbon atoms, $n$ and $m$ are both integers, $n$ has a value of from about 150 to about 10,000, and the ratio of $m$ to $n$ varies from about 2:100 to about 25:100. Preferably $n$ has a value of from about 600 to about 8000, most preferably from about 800 to about 2500.

The pyrrollic polymer disclosed retains most of the favorable characteristics of the unmodified polyketone and in addition has a lower melting point than the unmodified polyketone thereby permitting the extrusion forming of thermoplastic products without significant cross-linking and decomposition. One means to control the melting point and other properties of the polymer is to vary the ratio of

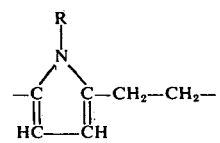

groups to

groups, that is the ratio of $m$ to $n$. The ratio of $m$ to $n$ preferably varies from about 3:100 to about 20:100 and most preferably from about 5:100 to about 10:100. When the ratio of $m$ to $n$ equals about 1:6, typically the polymer no longer has a crystalline structure. Thus, ratios of $m$ to $n$ exceeding about 1:6 are unnecessary to reduce crystallinity in the polymer. For example, run numbers 3 and 4 in Illustrative Embodiment I which follows indicate that pyrrollic polymers having more than 25% of their carbonyl groups reacted (equivalent to an $m$ to $n$ ratio of over 1:6) are typically amorphous. However, when the ratio of $m$ to $n$ is less than about 2:100, as shown in run 6 of Illustrative Embodiment I, the melting point of the polymer is not sufficiently reduced, and accordingly, when the polymer is extruded it cross-links and partially decomposes as evidenced by discoloration and water loss.

Selection of the substituent "R" in the polymer composition also has a significant effect on the properties of the polymer composition. Preferably R is an alkyl group of from 1 to 20 carbon atoms. More preferably R is an alkyl group of from 1 to 4 carbon atoms, e.g. a methyl, ethyl, propyl or butyl group. Moreover, when R is an alkyl group of from about 6 to about 10 carbon atoms, e.g. a n-heptyl group, the polymer has elastomeric properties comparable to plasticized poly(vinylchloride). In addition, polymers of this latter group having alkyl groups of from 6 to 10 carbon atoms resist swelling or dissolution in common solvents, such as naphtha, gasoline and motor oil, whereas some common block copolymers, such as a styrene-butadiene-styrene terpolymer, are sensitive to hydrocarbon solvents.

Process for Making the Polymer

Also of importance is the process for making the pyrrollic polymer which comprises reacting $x$ equivalents of a polyketone and $y$ moles of a primary monoamine in the presence of a catalyst wherein:

a. the polyketone is the equimolar alternating copolymer of ethylene and carbon monoxide having the generalized formula

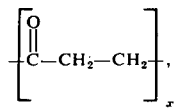

and b. the primary monoamine has the formula $RNH_2$ where R is selected from the group consisting of alkyl, aryl, and alkenyl groups of from 1 to 20 carbon atoms, and wherein $x$ and $y$ are both integers, $x$ has a value of from about 150 to about 10,000, and the ratio of $y$ to $x$ varies from about 1:52 to about 1:6.

The polyketone employed is prepared by any suitable catalyst system that results in an equimolar, alternating copolymer, e.g. a complex tetracyanonickelate catalyst and a hexafluoroisopropanol solvent. Other suitable catalysts are the palladium catalysts as stated above. Preferably $x$ has a value of from about 600 to about 8,000, corresponding to a molecular weight of from about 30,000 daltons to about 400,000 daltons. Most preferably, $x$ varies from about 800 to about 2,500, corresponding to a molecular weight of from about 50,000 daltons to about 140,000 daltons.

The primary monoamine is preferably a primary alkyl monoamine having from 1 to 20 carbon atoms. More preferably, the primary monoamine is a primary alkyl monoamine of from 1 to 4 carbon atoms, such as methylamine, ethylamine, n-propylamine, isopropylamine and n-butylamine. When the primary monoamine is a primary alkyl monoamine of from about 6 to about 10 carbon atoms, such as n-heptylamine, n-octylamine, or isoamylamine, the resulting polymer has elastomeric properties as discussed above.

By varying the ratio of monoamine to polyketone ($y$ to $x$) the melting point and other properties of the polymer are changed. Preferably the ratio of $y$ to $x$ varies from about 3:106 to about 1:7, and most preferably from about 1:22 to about 1:12.

The primary monoamine and polyketone are preferably contacted in the presence of a catalyst and a solvent. Useful catalysts include trifluoroacetic acid, p-toluenesulfonic acid and other strong acids. A preferred catalyst is trifluoroacetic acid. The amount of catalyst employed varies from about 0.1% weight to about 2.0% weight based on the combined weight of the polyketone and the primary monoamine. A preferred catalyst concentration is between about 0.3% weight and about 1.0% weight. The solvents employed are m-cresol and hexafluoroisopropanol. A preferred solvent is hexafluoroisopropanol. The amount of solvent employed is not critical. Preferred amounts vary from about 99% weight to about 80% weight of the combined weight of the resulting solution. Optionally, a compound such as magnesium sulfate is added to the reaction mixture to absorb the water generated in the condensation reaction, thereby improving the reaction equilibrium. The typical amount of absorbent, when added, varies from about 1% weight to about 5% weight based on the combined weight of the polyketone and the primary monoamine.

The polyketone and primary monoamine are contacted in any suitable manner. In one embodiment the polyketone is first dissolved in the solvent. Then the primary monoamine, catalyst, and optional absorbent are added to the mixture. The resulting mixture is then heated. Reaction temperatures vary from about 40°C to about 100°C, preferably from about 50°C to about 70°C. Reaction pressure may be atmospheric, sub-atmospheric or super-atmospheric. The polymer is separated from the reaction mixture by various procedures. In one procedure water is added to the reaction mixture thereby precipitating the polymer. The polymer is then removed, e.g. by a centifuge, filtered, and dried.

The pyrrollic polymers prepared according to this invention are useful as thermoplastic materials. Typically the pyrrollic polymer is extruded to form materials for use as automobile trim molding or for other decorative uses. Further, other materials are typically added to the pyrrollic polymer such as plasticizers, extenders and fillers. These other materials include, for example, glycerol, 1-4 butanediol, glass fiber and carbon black.

The invention is further illustrated by means of the following Illustrative Embodiments and Comparative Examples. Note that the embodiments and examples are given for the purpose of illustration only and that the invention is not to be regarded as limited to any of the specific conditions or reactants recited therein.

In all embodiments and examples, the polyketone employed was an equimolar alternating copolymer of ethylene and carbon monoxide of the general formula

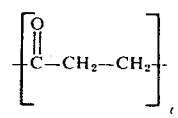

where $t$ is an integer having a value of about 5,000 commensurate with a total molecular weight of about 300,000 daltons. The polyketone was prepared with a quarternary ammonium tetracyanonickelate catalyst and a hexafluoroisopropanol (HFIP) solvent. Most of the catalyst was removed from the resulting polyketone leaving a nickel content for the polyketone of about 8 ppmw. The melting point of the polyketone was about 250°C and the swelling ratio was about 70. The "swelling ratio" is a measure of the crosslinking of a pressed film of the thermoplastic polymer examined. Swelling ratio is determined by cutting a disc from the pressed plastic film after heating at 215°C for 15 minutes and measuring the increase in weight after soaking the film in HFIP for 24 hours at ambient temperature. Swelling ratio is thus the weight of the swollen sample divided by the weight of the original disc. The higher the swelling ratio the less extensive is the crosslinking.

ILLUSTRATIVE EMBODIMENT I

Illustrative Embodiment I details the procedure involved in preparing the polymeric pyrrollic derivative. To a solution of 2.8 grams (g) polyketone (0.05 moles of repeating units

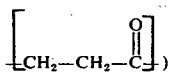

in 50 mililiters (ml) hexafluoroisopropanol (HFIP) was added 0.1 g trifluoroacetic acid as a catalyst, 1.0 g anhydrous MgSO$_4$ and 0.6 g (0.007 mole) methylamine. The magnesium sulfate was added to absorb the water generated in the reaction. The resulting solution was stirred at reflux (about 60°C) for one hour, then cooled and agitated in a mixer with 400 ml water to precipitate the polymer. After filtering and drying, 2.85 g of polymer was removed. The polymer had a melting point of 204°C as measured by differential scanning calorimetry (DSC) and contained 2.2% weight (w) nitrogen. A $^{13}$C-NMR spectrum of the polymer revealed methyl pyrrole formation. By calculation it was determined that about 10% of the carbonyl groups had been reacted. The results of this embodiment are shown as Run Number 1 in Table I.

In a procedure similiar to that employed in Run Number 1, other pyrrollic derivatives were prepared. The only major differences in the procedure were in the type of reagent employed and the amount of the reagent. The results are presented as Run Numbers 2 through 12 in Table I. The percent nitrogen reported is total nitrogen as measured by the Kjehdahl method. Accordingly, the percent nitrogen may reflect minor amounts of unreacted amine. The melting point of the polymer is measured by differential scanning calorimetry. The percent carbonyl groups reacted and the ratio of pyrollic groups to carbonyl groups are calculated on the basis of the nitrogen content of the polymer and to be consistent with NMR analysis. In runs 1 and 4, the polymer was pressed, then repressed, producing an acceptable molding in both instances. In run 9, the polymer was completely soluble in HFIP, indicating that the polymer had undergone almost no crosslinking.

TABLE I

| Run No. | Reagent | % N | % Carbonyl Groups Reacted | Ratio of Pyrrollic Group to Carbonyl Groups | Melting Point °C |
|---|---|---|---|---|---|
| 1 | methylamine | 2.2 | 10 | 5.5:100 | 204 |
| 2 | | 2.4 | 11 | 6.2:100 | 202 |
| 3 | | 5.5 | 25 | 16.7:100 | amorphous |
| 4 | | 10.6 | 49 | 48.0:100 | amorphous |
| 5 | ethylamine | 0.8 | 4 | 2.1:100 | 226 |
| 6 | n-butylamine | 0.4 | 3 | 1.5:100 | 236 |
| 7 | n-heptylamine | 0.8 | 5 | 2.6:100 | 232 |
| 8 | | 1.8 | 10 | 5.5:100 | 200 |
| 9 | | 4.2 | 24 | 15.8:100 | amorphous |
| 10 | | 4.9 | 28 | 19.4:100 | amorphous |
| 11 | dodecylamine | 2.5 | 15 | 8.8:100 | amorphous |
| 12 | benzylamine | 1.3 | 8 | 4.3:100 | 218 |

ILLUSTRATIVE EMBODIMENT II

Table II below compares some of the properties of the pyrrollic polymer prepared in Run Number 9 of Illustrative Embodiment I with three other polymers. Some of the values for the thermoplastic polymers were obtained from an article by W. R. Hendricks and R. J. Enders in "Rubber Technology", edited by M. Morton, Van Nostrand-Rheinhold Press, New York, 1973, p. 519.

TABLE II

| Test | Pyrrollic Polymer | Styrene-Butadiene-Styrene Block Copolymer | Plasticized Polyvinyl-Chloride | Low Density Polyethylene |
|---|---|---|---|---|
| Tensile Strength at break, psi | 5000–6000 | 4510 | 1200 | 1100 |
| Stress at 300% extension, psi | 3890 | 250 | 950 | not available |
| Elongation at break, % | 350 | 1115 | 360 | 120 |
| Set at break, % | 80 | 23 | 150 | 65 |

TABLE II-continued

| Test | Pyrrollic Polymer | Styrene-Butadiene-Styrene Block Copolymer | Plasticized Polyvinyl-Chloride | Low Density Polyethylene |
|---|---|---|---|---|
| Elongation/Set | 4.4 | 49 | 2.4 | 1.9 |

COMPARATIVE EXAMPLE I

In Comparative Example I aqueous ammonia was employed as the reagent in place of a primary monoamine. To a solution of 2.8 g polyketone in 50 ml HFIP was added 0.1 g trifluoroacetic acid and 2.5 ml concentrated aqueous ammonia. The solution was stirred at reflux (about 60°C) for one hour, then cooled and agitated in a mixer with 400 ml water to precipitate the polymer. After filtering and drying, a brown polymer with a melting point of 174°C and containing 3.7% w nitrogen was obtained. When a sample of the polymer was pressed to a film at 200°C the material became totally insoluble in HFIP indicating that it was highly crosslinked.

COMPARATIVE EXAMPLE II

In Comparative Example II a bifunctional amine was employed instead of a primary monoamine. To a solution of 2.8 g polyketone in 100 ml HFIP was added 0.1 g trifluoroacetic acid, 1.0 g anhydrous MgSO₄ and 0.5 g (0.005 mole) 1,6-hexamethylenediamine. The resulting solution was stirred at reflux (about 60°C) for one hour, then cooled and agitated in a mixer with 400 ml water to precipitate the polymer. After filtering and drying, 3.6 g of polymer was recovered having a nitrogen content of about 8.8% w. The polymer was amorphous and completely insoluble in HFIP indicating that the polyketone was crosslinked by the bifunctional reagent.

We claim as our invention:

1. The thermoplastic polymer characterized by random distribution along the polymer chain of $n$ units of

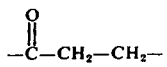

and $m$ units of

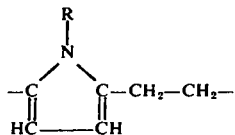

where R is selected from the group consisting of alkyl, aryl, and alkenyl groups of from 1 to 20 carbon atoms and wherein $n$ and $m$ are both integers, $n$ has a value of from about 150 to about 10,000, and the ratio of $m$ to $n$ varies from about 2:100 to about 25:100.

2. The polymer of claim 1 wherein R is an alkyl group of from 1 to 4 carbon atoms.

3. The polymer of claim 2 wherein R is a methyl radical, $n$ has a value of from about 600 to about 8,000, and the ratio of $m$ to $n$ varies from about 3:100 to about 20:100.

4. The polymer of claim 1 wherein R is an alkyl group of from 6 to 10 carbon atoms.

5. The polymer of claim 4 wherein R is a normal-heptyl radical, $n$ has a value of from about 600 to about 8,000, and the ratio of $m$ to $n$ varies from about 3:100 to about 20:100.

6. The process for making a thermoplastic polymer which comprises reacting $x$ equivalents of a polyketone and $y$ moles of a primary monoamine in the presence of a strong acid catalyst and a solvent at a temperature of between about 40°C and about 100°C wherein:
  a. said polyketone is the equimolar alternating copolymer of ethylene and carbon monoxide having the formula

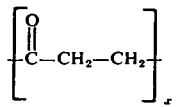

b. said primary monoamine has the formula RNH₂ where R is selected from the group consisting of alkyl, aryl, and alkenyl groups of from 1 to 20 carbon atoms, and
  c. $x$ and $y$ are integers, $x$ has a value of from about 150 to about 10,000, and the ratio of $y$ to $x$ varies from about 1:52 to about 1:6.

7. The process according to claim 6 wherein R is an alkyl group of from 1 to 4 carbon atoms.

8. The process according to claim 7 wherein R is a methyl radical, $x$ has a value of from about 600 to about 8,000, and the ratio of $y$ to $x$ varies from about 3:106 to about 1:7.

9. The process according to claim 6 wherein R is an alkyl group of from 6 to 10 carbon atoms.

10. The process according to claim 9 wherein R is a normal-heptyl radical, $x$ has a value of from about 600 to about 8,000, and the ratio of $y$ to $x$ varies from about 3:106 to about 1:7.

* * * * *